United States Patent [19]

Clark

[11] Patent Number: 4,563,720

[45] Date of Patent: Jan. 7, 1986

[54] HYBRID AC LINE TRANSIENT SUPPRESSOR

[75] Inventor: O. Melville Clark, Tempe, Ariz.

[73] Assignee: General Semiconductor Industries, Inc., Tempe, Ariz.

[21] Appl. No.: 601,229

[22] Filed: Apr. 17, 1984

[51] Int. Cl.[4] .............................................. H02H 9/04
[52] U.S. Cl. ........................................ 361/56; 361/91; 361/111; 361/119
[58] Field of Search ................ 361/56, 55, 91, 111, 361/118, 119, 127; 333/12

[56] References Cited

U.S. PATENT DOCUMENTS

| | | | |
|---|---|---|---|
| 3,527,985 | 9/1970 | Brown | 361/55 |
| 4,068,279 | 1/1978 | Byrnes | 361/56 |
| 4,463,406 | 7/1984 | Sirel | 361/56 |

Primary Examiner—Patrick R. Salce
Attorney, Agent, or Firm—Cahill, Sutton & Thomas

[57] ABSTRACT

An AC line transient suppressor includes a first metal oxide varistor connected between the "hot" and "neutral" lines of an AC power system. A first inductor is connected from the hot line to one terminal of a second metal oxide varistor, the other terminal of which is connected to the neutral line. A second inductor having approximately twice the value of the first one is connected from the junction between the first inductor and the second metal oxide varistor to a hot supply terminal to which equipment to be protected is connected. A silicon suppressor having a predetermined clamping voltage is coupled between the hot supply terminal and the neutral line conductor. The inductance of the first inductor has a value selected to divert approximately 95% of the transient surge current through the first metal oxide varistor. The second inductor diverts approximately 65% of the remaining surge current through the second metal oxide varistor, so that only approximately 2% of the total surge current flows through the silicon junction diode suppressor, allowing it to provide a low clamping voltage.

14 Claims, 4 Drawing Figures

HYBRID AC LINE TRANSIENT SUPPRESSOR

BACKGROUND OF THE INVENTION

The invention relates to transient overvoltage suppressors, and more particularly to transient overvoltage suppressors which optimally combine metal oxide varistors, inductors, and silicon junction diode suppressors to achieve, at the lowest feasible cost, the lowest clamping level of a transient overvoltage having a very high open circuit voltage level and a very high short circuit current level.

The sudden failure or gradual step by step deterioration of electrical equipment due to high voltage transients or surges stemming from lighting or man-made occurrences has long been recognized as a serious problem in the electrical industry. The literature has reported many investigations of transient overvoltage occurrences on a wide variety of power distribution systems, both residential and commercial. These studies have shown that voltage spikes of 6 kilovolts or more are not uncommon on residential and commercial lines. Overvoltage transients generated by lighting or line switching or full voltage starting of electric motors can easily damage a wide variety of electrical and electronic equipment. Reliable protection of electrical equipment against such transient overvoltages by various surge protectors known in the prior art requires that these surge protectors be able to reduce the transient overvoltage to a safe value well below the maximum voltage rating of the protected electrical equipment. Recently, the Institute of Electrical and Electronics Engineers has issued a specification for the worst case overvoltage condition, as described in specification IEE-587 1980, that ordinarily will be expected on power mains within a building. This worst case overvoltage has an open circuit peak value of 6,000 volts and a short circuit peak current of 3,000 amperes. The open circuit voltage has a rise time of 1.5 microseconds to its crest, and a 50 microsecond delay to its half maximum value. The short circuit current has an 8 microsecond rise time and a 20 microsecond delay to fall to its half maximum value. Overvoltage surges of this type have very high energy, and can easily cause arcing within inadequately protected electrical equipment that will destroy power transistors, integrated circuits and other components, and can cause charring within printed circuit boards.

A variety of surge suppressor circuits intended to suppress such overvoltages have been proposed. The state of the art is generally indicated by U.S. Pat. Nos. 4,419,711; 3,793,535; 4,328,253; 4,212,045; 4,095,163; and 3,480,830. The prior art surge suppressor believed to be closest to the present invention includes a metal oxide varistor connected between the hot and neutral line conductors of the AC power line. An inductor is connected from the junction between the hot line conductor and the metal oxide varistor to the hot supply terminal to which the protected equipment is connected. A large silicon junction diode suppressor device, such as one marketed by the present assignee under the trademark "TRANSZORB", is connected between the hot supply terminal and the neutral line conductor. The inductor diverts a substantial amount of the surge current through the metal oxide varistor, reducing the amount of current that flows through the TRANSZORB suppressor in its breakdown mode. However, the degree of clamping that would be desired to provide adequate protection to the protected equipment against surges of the magnitude referred to in the above-mentioned IEEE specification at a satisfactorily low cost has not been accomplished. There is an unmet need for such a low cost surge suppressor.

SUMMARY OF THE INVENTION

Accordingly, it is an object of the invention to provide the lowest clamping voltage level, (i.e., the maximum clamping) of a transient overvoltage, especially an overvoltage equal to or greater than the one described in the above-mentioned IEEE specification, at the lowest possible cost.

It is another object of the invention to optimize use of low cost metal oxide varistor, silicon junction diode suppressor and inductor components so as to obtain the lowest possible clamping level of an overvoltage at minimum cost.

It is another object of the invention to provide a highly reliable overvoltage clamping device.

Briefly described, and in accordance with one embodiment thereof, the invention provides a hybrid surge suppressor circuit that is useful in suppressing AC line transient overvoltages between a hot line terminal and a neutral line terminal that can be connected to the AC line, and including a first metal oxide varistor coupled between the hot and the neutral line terminals, a first inductor coupled between the hot line terminal and an intermediate conductor, a second metal oxide varistor coupled between the intermediate conductor and the hot line terminal, a second inductor coupled between the intermediate conductor and a hot supply terminal to which the protected equipment can be connected, and a semiconductor junction surge protection diode coupled between the hot supply terminal and the neutral line terminal.

In the described embodiment of the invention, the first metal oxide varistor is selected to have the capability of conducting a current approximatly equal to the maximum expected short circuit surge current and a breakdown voltage sufficiently high that even when the metal oxide varistor degrades slightly (which is characteristic of metal oxide varistors) its breakdown voltage is still greater than the maximum peak operating voltage occurring on the AC line. The inductances of the first and second inductors are selected to have a sufficiently high value to divert approximately 95% of the surge current into the first metal oxide varistor. The ratio between the inductances of the first and second inductors is selected to cause them to divert approximately two-thirds of the remaining surge current through the second metal oxide varistor. Thus, only approximately two percent of the total surge current flows through the semiconductor junction surge protection diode, giving it a very low, flat clamping voltage which is applied to the terminals of the protected equipment. A third metal oxide varistor is coupled between the neutral line terminal and an earth ground terminal, which can be connected to an earth ground conductor of the AC power distribution system. In one embodiment of the invention, a capacitor is connected between the intermediate conductor and the neutral line conductor and a second capacitor is connected between the hot supply terminal and the neutral line conductor. These capacitors, in combination with the first and second inductors, perform a filtering operation to attenuate high frequency noise on the AC line. Additional combinations of internal capacitors and other components also may be added for filtering purposes.

DESCRIPTION OF THE INVENTION

Figure 1:
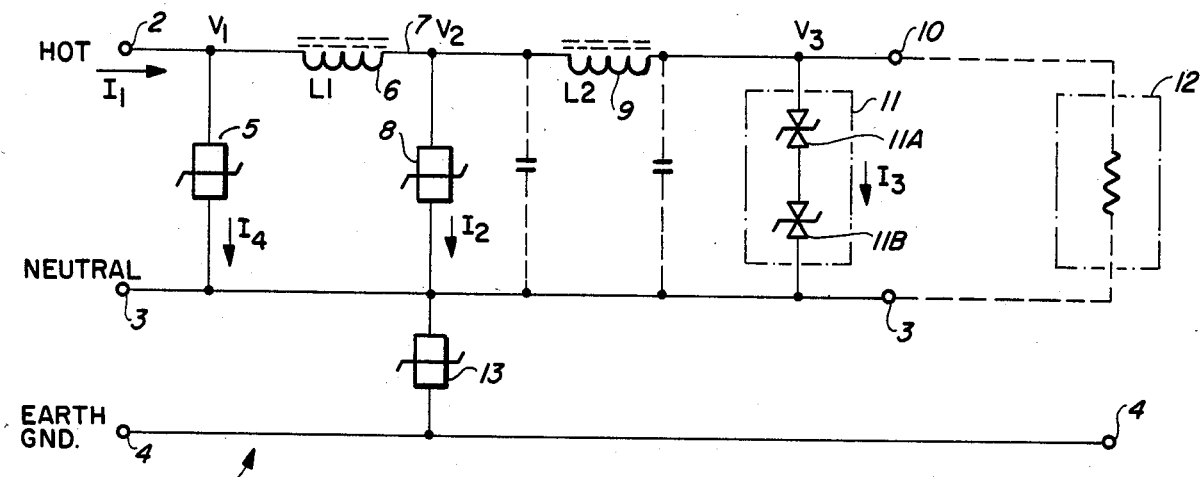
FIG. 1 is a schematic circuit diagram of the surge suppressor of the present invention.

Referring now to FIG. 1, hybrid surge suppressor 1 includes a "hot" line terminal 2 and a "neutral" line terminal 3 which can be respectively connected to the hot and neutral conductors of a typical AC power line (not shown). Hybrid surge suppressor circuit 1 also includes an "earth ground" terminal 4 that can be connected to the earth ground conductor of the AC power line. A first metal oxide varistor 5 is connected between hot line terminal 2 and neutral line terminal 3. The voltage on hot line terminal 2 is designated V1.

An inductor 6 is connected between terminal 2 and an intermediate conductor 7. The voltage on intermediate conductor 7 is designated V2. A second metal oxide varistor 8 is connected between conductor 7 and neutral terminal 3. A second inductor 9 is connected between conductor 7 and a hot "supply" terminal 10. The voltage on hot supply terminal 10 is designated V3. A silicon junction diode suppressor device designated by reference numeral 11 is connected between hot supply terminal 10 and neutral terminal 3. Silicon surge suppressor 11 as shown, may include one, two, or more silicon junction suppressor devices, depending on their operating voltages and the desired clamping voltage. As shown in FIG. 1, silicon surge suppresor 11 includes two series-connected silicon junction suppressor devices 11A and 11B.

Reference numeral 12 designates the "load", or equipment to be protected from transient overvoltages and surge currents appearing on the AC line (not shown).

A third metal oxide varistor 13 is connected between neutral line terminal 3 and earth ground terminal 4. This is to maintain a minimum voltage between neutral conductor 3 and earth ground conductor 4 without violating electrical codes or regulations.

The total surge current flowing from the AC line into surge suppressor 1 is designated by I1. The portion of current I1 flowing through metal oxide varistor 5 is called I4. The portion flowing through metal oxide varistor 8 is designated I2, and the portion flowing through the silicon surge suppressor 11 is designated I3.

In the described embodiment of the invention, metal oxide varistors 5, 8 and 13 can all be implemented by means of metal oxide varistors, such as the V130LA20 type manufactured by General Electric Company. The two silicon surge suppressor diode devices 11A and 11B can be IN6064A TRANSZORB silicon surge suppressor diode devices manufactured by General Semiconductor Industries, Inc., the present assignee. (Note that although the two series connected TRANSZORB silicon surge suppressors 11A and 11B are shown in FIG. 1, different numbers of them can be used to satisfy different clamping voltage requirements. For example, only one TRANSZORB device might be used in a particular application, while three series-connected TRANSZORB device might be used in a different application requiring a much higher clamping level.) (Note that although bidirectional TRANZSORB devices are shown, unidirectional TRANSZORB devices could also be used.) These two TRANSZORB suppressors each are rated at 1.5 kilowatts and have a breakdown voltage of 110 volts at one milliampere. The metal oxide varistors 5, 8 and 13 each are rated for 120 V AC operating conditions with a surge current rating of 6,500 amperes. The value of inductor 6 is approximately 50 microhenries and the value of inductor 9 is approximately 100 microhenries.

Figure 2:
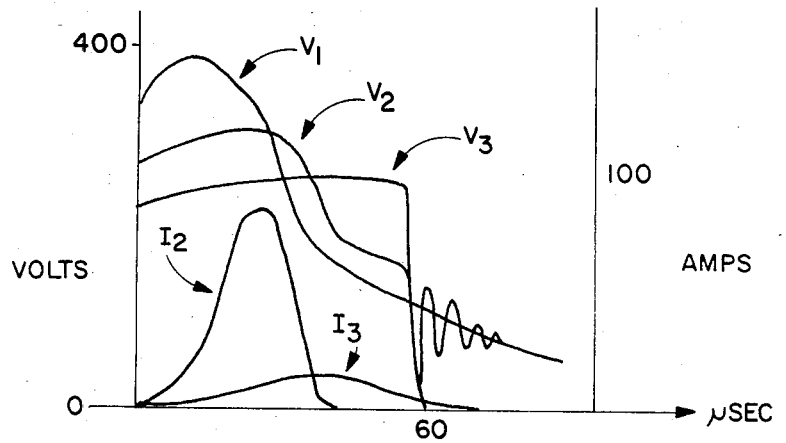
FIG. 2 is a graph useful in explaining the operation of the surge suppressor of FIG. 1.

To explain the operation of hybrid surge suppressor 1, it will be convenient to refer to FIG. 2, which shows the relative levels of the three voltages V1, V2 and V3 and the relative values of two currents, namely current I2 flowing through metal oxide varistor 8 and the current I3 flowing through silicon surge suppressor 11 when an open circuit transient overvoltage of 1500 volts is applied to hot line terminal 2 and neutral line terminal 3. The voltage V1 rises to a peak of nearly 392 volts. The total current I1 was measured to be 535 amperes, although this current pulse is not shown in FIG. 2. The inductance of inductors 6 and 9 causes the current I4 flowing through metal oxide varistor 5 to be 438 amperes. The voltage V2 on conductor 7 goes to a peak of 295 volts and the current I2 flowing through metal oxide varistor 8 has a peak value of 83 amperes. The clamping voltage V3 appearing on hot supply terminal 10 is fairly level, at a voltage of approximately 245 volts. The current I3 flowing through silicon surge suppressor 11 has a peak value of only approximately 14 amperes.

Thus, it can be seen that for the values given above, the 1500 volt overvoltage pulse appearing on an AC line to which hybrid surge suppressor cirucit 1 is connected has been effectively clamped to approximately 245 volts. This clamp voltage is the maximum voltage that is applied between the hot supply terminal 10 and neutral terminal 3 to the protected circuit 12 during the 1500 volt overvoltage pulse. The clamped voltage V3 can be seen to be quite level and independent of the actual amplitude of the overvoltage pulse on the AC line. Furthermore, practically all of the surge current has been caused to flow through metal oxide varistor 5; a major portion of the remaining surge current flows through the second metal oxide varistor 8, so that only a very small portion I3 of the surge current I1 flows through the silicon surge suppressor 11. This low value of I3 is what results in the very flat, low clamping voltage V3 and also results in high reliability of the circuit 1 under high surge current conditions.

Figure 3A:
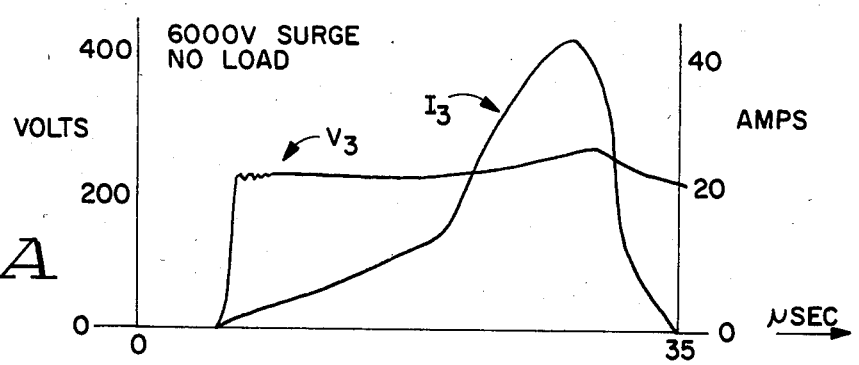
FIGS. 3A and 3B are additional graphs useful in explaining the operation of the surge suppressor of FIG. 1.

Next, it is instructive to refer to FIG. 3A to illustrate how the same hybrid surge suppressor circuit 1 responds to a 6,000 volt transient overvoltage of the magnitude referred to in the above-mentioned IEEE specification No. 587. FIG. 3A shows the response of the circuit of FIG. 1 for the condition in which the circuit 12 to be protected is disconnected from terminals 10 and 3. In this case, the clamping voltage V3 nevertheless is quite level, and has a voltage of approximately 250 to 275 volts. The corresponding surge current (not shown in FIG. 3) was measured to be 2550 amperes. The portion I3 of this 2550 ampere surge current flowing through surge essor 11 has the waveform shown in FIG. 3A, the peak suppressor 11 has the waveform shown in FIG. 3A, the peak current being approximately 44 amperes. The corresponding peak value of the current I2 (not shown) is 82 amperes. Thus, the current I4 flowing through the first metal oxide varistor 1 is 2424 amperes, approximatley 95% of the total surge current I1. Approximately 65% of the remainder of (126 amperes) flows through metal oxide varistor 8, leaving only the small 44 ampere current for I3.

Figure 3B:
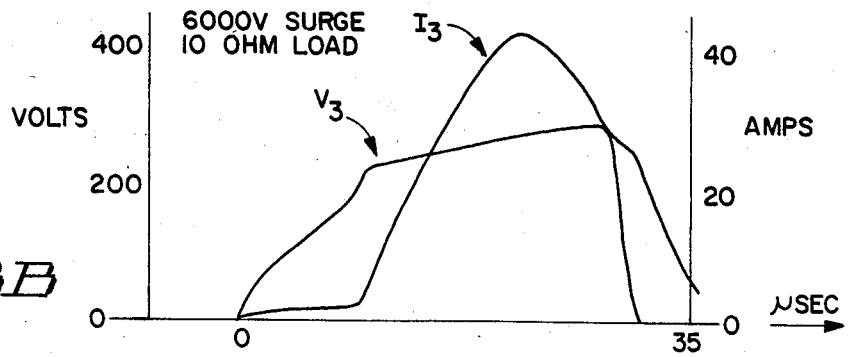

The operation is quite similar for the condition in which the electrical equipment 12 is connected to terminals 10 and 3, wherein the input impedance of electrical equipment 12 is approximately 10 ohms. This condition is shown in FIG. 3B, and the results are not much different than those shown in FIG. 3A. The maximum value of clamping voltage V3 is approximately 290 volts.

Thus, it is seen that the hybrid component surge suppressor circuit shown in circuit 1 can give adequate enough surge protection to allow designers to utilize electrical components having maximum voltage rating of 400 volts in electrical equipment 12, without having to be unduly concerned about the reliability of such equipment. It can be seen that the technique of adding to the above-mentioned closest prior art circuit an additional inductor (inductor 9) and an additional metal oxide varistor (metal oxide varistor 8) and selecting the ratio of the two inductors 9 and 6 to be approximately 2 to 1 causes nearly all of the energy to be dissipated by the metal oxide varistors, by "stretching out" the overvoltage pulse and the surge current pulse. The voltage divider effect of inductors 6 and 9 causes the rising slope of V2 to be considerably less steep than the rising slope of V1, allowing metal oxide varistor 5 to dissipate most of the energy. The addition of metal oxide varistor 8 and inductor 9 causes the portion of the surge current flowing through silicon surge suppressor 11 to be so low that its clamping voltage remains almost constant, irrespective of the magnitude of the overvoltage applied to the AC line.

The low value of current I3 not only results in a relatively constant clamping voltage, it also results in very high reliability of the silicon surge suppressor 11, and allows a silicon surge suppressor to be utilized which has a very small area and is consequently very inexpensive, considering the high current level of the impinging surge current I1. The above-mentioned prior art surge suppressor utilizing one metal oxide varistor and one inductor and one silicon surge suppressor is capable only of clamping the above-mentioned 6,000 volt overvoltage to a level in the range from 375 to 400 volts for the maximum rated currents of about 2550 amperes. The hybrid surge suppressor of FIG. 1, costs only slightly more than the closest prior art one previously decribed, and clamps the overvoltage to nearly 100 volts less. Although the prior art device's clamping voltage could be reduced somewhat by using a substantially larger and much more expensive silicon surge suppressor, my experiments have lead me to believe that it would be nearly impossible to design the prior art circuit to produce as low of a lower clamping voltage as my present circuit 1 achieves.

While the invention has been described with reference to a particular embodiment thereof, those skilled in the art will be able to make various modifications to the described embodiment of the invention without departing from the true spirit and scope thereof.

For example, another metal oxide varistor could be connected between terminals 10 and 3 of the circuit of FIG. 1 instead of TRANSZORB devices 11. The surge suppressor circuit 1 would not clamp overvoltage transients quite as effectively as when TRANSZORB surge suppressors are used, but it would nevertheless be quite effective. Various capacitive, resistive and inductive elements other than those shown in FIG. 1 might be added to the structure shown to improve filtering of various undesired frequency components in the AC power line connected to terminals 2 and 3.

I claim:

1. A pulse suppressor circuit for suppressing a transient overvoltage and accompanying current surge on an AC power line, said pulse suppressor circuit comprising in combination:
    (a) first and second metal oxide varistors, each having first and second terminals, each having a breakdown voltage greater than any normal AC voltage appearing on said AC power line;
    (b) first and second inductors each having first and second terminals, said second inductor having a substantially higher inductance than said first inductor;
    (c) silicon surge suppressor diode means having first and second terminals;
    (d) a hot line terminal for connection to a hot line conductor of said AC power line, and a neutral line terminal for connection to a neutral line conductor of said AC power line;
    (e) a hot supply terminal for connection to a circuit to be protected;
    (f) first means for coupling said first terminal of said first metal oxide varistor and said first terminal of said first inductor to said hot line terminal;
    (g) second means for coupling said second terminal of said first inductor, said first terminal of said second metal oxide varistor, and said first terminal of said second inductor together to an intermediate conductive node;
    (h) third means for coupling said first terminal of said silicon suppressor diode means and said second terminal of said second inductor to said hot supply terminal; and
    (i) fourth means for coupling said second terminals of said first and second metal oxide varistors and said second terminal of said silicon surge suppressor diode means to said neutral line terminal,
wherein said inductance of said second inductor is approximately twice the inductance of said first inductor.

2. The pulse suppressor circuit of claim 1 wherein said first metal oxide varistor has a breakdown voltage which is greater than the breakdown voltage of said second metal oxide varistor by an amount great enough to compensate for degradation of the breakdown voltage of said first metal oxide varistor due to conducting of nearly all of the current of said current surge.

3. The pulse suppressor circuit of claim 1 wherein said silicon surge suppressor diode means is bi-directional.

4. The pulse suppressor circuit of claim 2 wherein said inductance of said first inductor is approximatly 50 microhenries and said inductance of said second inductor is approximately 100 microhenries.

5. The pulse suppressor circuit of claim 4 wherein said breakdown voltages of said first and second metal oxide varistors are each roughly 130 volts RMS.

6. The pulse suppressor circuit of claim 5 wherein the breakdown voltage of said silicon suppressor diode means is roughly 220 volts DC.

7. The pulse suppressor circuit of claim 6 wherein said first metal oxide varistor can conduct a current surge having a peak magnitude of roughly 3000 amperes and a duration of approximately 20 microseconds.

8. The pulse suppressor circuit of claim 7 including an earth ground terminal for connection to an earth ground line conductor of said AC power line and to a ground terminal of said circuit to be protected, and also including a third metal oxide varistor having a first terminal coupled to said neutral line terminal and a second terminal coupled to said earth ground terminal.

9. The pulse suppressor circuit of claim 8 wherein approximately 95% of the current of said current surge flowing in said AC power line and accompanying a transient overvoltage of roughly 6000 volts between conductors of said AC power line is caused to flow through said first metal oxide varistor by the inductance of said first and second inductors.

10. The pulse suppressor circuit of claim 9 wherein said second inductor causes approximately two-thirds of the remaining current of said current surge to flow through said second metal oxide varistor, and wherein only approximately several percent of said current surge flows through said silicon surge suppressor diode means, causing said silicon surge suppressor diode means to clamp said transient overvoltage to a relatively constant level that is applied to said circuit to be protected during said transient overvoltage.

11. The pulse suppressor circuit of claim 10 wherein the breakdown voltage of said third metal oxide varistor is roughly 130 volts RMS.

12. The pulse suppressor circuit of claim 11 including a first capacitor coupled between said intermediate conductive node and said neutral line terminal and a second capacitor coupled between said hot supply terminal and said neutral line terminal in order to attenuate any frequency signals on said AC power line.

13. The pulse suppressor circuit of claim 1 wherein said silicon surge suppressor diode means is unidirectional.

14. A pulse suppressor circuit for suppressing a transient overvoltage and accompanying current surge on an AC power line, said pulse suppressor circuit comprising in combination:
 (a) first and second metal oxide varistors, each havng first and second terminals, each having a breakdown voltage greater than any normal AC voltage appearing on said AC power line;
 (b) first and second inductors each having first and second terminals, said second inductor having a substantially higher inductance than said first inductor;
 (c) surge suppressor means having first and second terminals;
 (d) a hot line terminal for connection to a hot line conductor of said AC power line, and a neutral line terminal for connection to a neutral line conductor of said AC power line;
 (e) a hot supply terminal for connection to a circuit to be protected;
 (f) first means for coupling said first terminal of said first metal oxide varistor and said first terminal of said first inductor to said hot line terminal;
 (g) second means for coupling said second terminal of said first inductor, said first terminal of said second metal oxide varistor, and said first terminal of said second inductor together to an intermediate conductive node;
 (h) third means for coupling said first terminal of said surge suppressor means and said second terminal of said second inductor to said hot supply terminal; and
 (i) fourth means for coupling said second terminals of said first and second metal oxide varistors and said second terminal of said surge suppressor means to said neutral line terminal,
wherein said inductance of said second inductor is approximately twice the inductance of said first inductor.

* * * * *